US012621026B2

(12) United States Patent
Tawa et al.

(10) Patent No.: US 12,621,026 B2
(45) Date of Patent: May 5, 2026

(54) RADIO COMMUNICATION APPARATUS, METHOD FOR RADIO COMMUNICATION APPARATUS, AND NON-TRANSITORY COMPUTER READABLE MEDIUM

(71) Applicant: NEC Corporation, Tokyo (JP)

(72) Inventors: Noriaki Tawa, Tokyo (JP); Toshihide Kuwabara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 18/266,389

(22) PCT Filed: Nov. 5, 2021

(86) PCT No.: PCT/JP2021/040738
§ 371 (c)(1),
(2) Date: Jun. 9, 2023

(87) PCT Pub. No.: WO2022/130821
PCT Pub. Date: Jun. 23, 2022

(65) Prior Publication Data
US 2024/0048200 A1     Feb. 8, 2024

(30) Foreign Application Priority Data

Dec. 17, 2020     (JP) ................................. 2020-209739

(51) Int. Cl.
*H04B 7/06*          (2006.01)
*H04B 7/08*          (2006.01)
(52) U.S. Cl.
CPC ........... *H04B 7/0617* (2013.01); *H04B 7/086* (2013.01)
(58) Field of Classification Search
CPC ......... H04B 7/0617; H04B 7/086; H04B 7/06
(Continued)

(56) References Cited

U.S. PATENT DOCUMENTS

2009/0323783 A1* 12/2009 Buris ..................... H04B 17/21
375/260
2010/0150013 A1* 6/2010 Hara ...................... H04B 17/12
370/252
(Continued)

FOREIGN PATENT DOCUMENTS

JP          2004-235829 A          8/2004
JP          2005-064626 A          3/2005
(Continued)

OTHER PUBLICATIONS

International Search Report for PCT Application No. PCT/JP2021/040738, mailed on Dec. 28, 2021.

*Primary Examiner* — Don N Vo
(74) *Attorney, Agent, or Firm* — Sughrue Mion, PLLC

(57)          ABSTRACT

An object of the present disclosure is to provide a radio communication device, a method for a radio communication device, and a program with which it is possible to perform calibration of an antenna easily. A radio communication device according to the present disclosure comprises: a calibration control unit that performs DL control to transmit a calibration downlink (DL) signal from an antenna other than one of a plurality of antennas DA and to receive a calibration DL signal by the one antenna, and UL control to transmit a calibration uplink (UL) signal from the one antenna and to receive a calibration UL signal by the antenna other than the one antenna; and a calibration coefficient calculating unit that calculates a calibration coefficient on the basis of a DL channel coefficient of a transmitter and a UL channel coefficient of a receiver.

8 Claims, 13 Drawing Sheets

(58) Field of Classification Search
USPC ........................................................ 455/73
See application file for complete search history.

(56) References Cited

U.S. PATENT DOCUMENTS

| | | | | |
|---|---|---|---|---|
| 2016/0352002 | A1* | 12/2016 | Aue ..................... | H04B 7/0617 |
| 2018/0040964 | A1* | 2/2018 | Benjebbour ............. | H01Q 3/26 |
| 2021/0076370 | A1* | 3/2021 | Bengtsson ............ | H04W 72/23 |

FOREIGN PATENT DOCUMENTS

| | | |
|---|---|---|
| JP | 2008-166866 A | 7/2008 |
| JP | 2012-182804 A | 9/2012 |
| JP | 2013-535124 A | 9/2013 |
| WO | 2015/185680 A1 | 12/2015 |

* cited by examiner

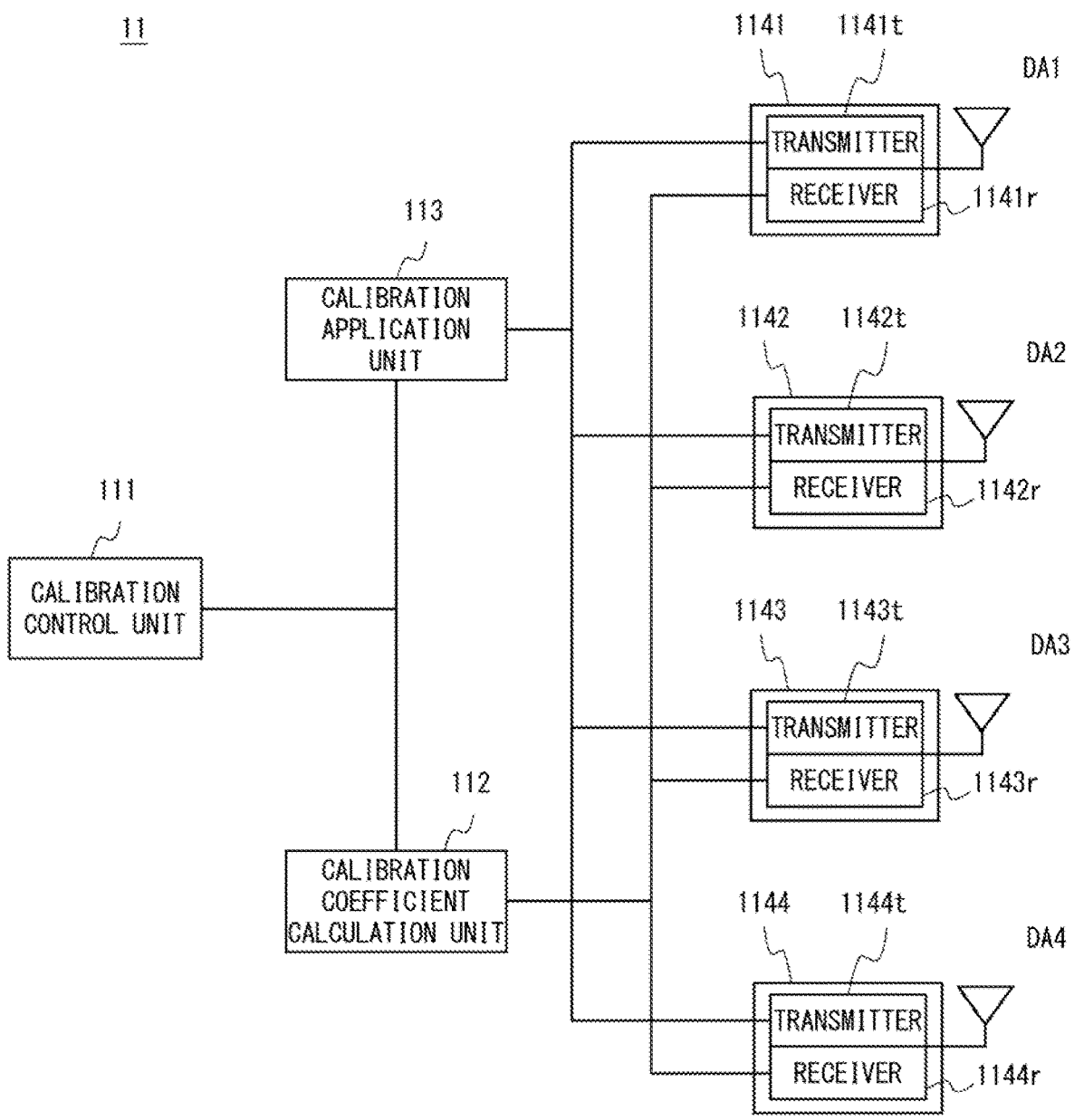
F i g.  1

RADIO COMMUNICATION APPARATUS, METHOD FOR RADIO COMMUNICATION APPARATUS, AND NON-TRANSITORY COMPUTER READABLE MEDIUM

This application is a National Stage Entry of PCT/JP2021/040738 filed on Nov. 5, 2021, which claims priority from Japanese Patent Application 2020-209739 filed on Dec. 17, 2020, the contents of all of which are incorporated herein by reference, in their entirety.

TECHNICAL FIELD

The present disclosure relates to a radio communication apparatus, a method for the radio communication apparatus, and a program, and particularly relates to a radio communication apparatus, a method for the radio communication apparatus, and a program that can easily perform calibration of a distributed antenna.

BACKGROUND ART

In a recent base station, an improvement in communication capacity is achieved by using a multiple input multiple output (MIMO) transmission method. A base station associated with the MIMO transmission method includes a plurality of antennas and a modulator-demodulator, and transmits and receives a different radio signal from each of the plurality of antennas and the modulator-demodulator. Frequency use efficiency is increased by spatially multiplexing a radio signal (user signal) by using the plurality of radio signals (transmission/reception signals). The base station associated with the MIMO transmission method can increase an antenna gain in a specific direction by using the plurality of antennas, suppress interference due to null formation, and the like. The technique is referred to as beam forming, and mainly includes two kinds. One is analog beam forming, and the other is digital beam forming. The analog beam forming is a technique for increasing an antenna gain in a specific direction by distributing (dispersing) one or more radio signals to a plurality of antennas and providing a different phase to each radio signal by a phase shifter and the like. Meanwhile, the digital beam forming is a technique for adjusting a phase and an amplitude of a transmission/reception signal of each antenna. A base station associated with the digital beam forming includes a transceiver in the same number as an antenna number, and digitally controls a transmission/reception signal from each antenna. In this way, a spatial multiplexing technique such as zero forcing (ZF) and minimum mean square error (MMSE) can be used. In the ZF and MMSE, control in a null direction of an antenna gain is also performed, and thus interference of a plurality of transmission/reception signals can be suppressed, and a signal can be more efficiently multiplexed.

In order to use the spatial multiplexing technique, a channel coefficient indicating a propagation environment of a radio wave needs to be obtained. By using, for example, a reception signal (uplink (UL) signal) of the base station, the base station estimates a channel coefficient from a reference signal included in the reception signal. Processing of estimating a channel coefficient is referred to as channel estimation. When the base station receives a UL signal from a plurality of user terminals (UE: user equipment), the UL signals interfere with each other. Thus, the base station can perform UL communication with each of the UEs by separating a multiplexed UL signal by using a channel coefficient being obtained from the channel estimation and the spatial multiplexing technique. Meanwhile, in down link (DL) communication from the base station to the UE, multiplexed DL communication is performed by transmitting a DL signal to which the spatial multiplexing technique is adapted in advance by using the channel coefficient estimated from the UL signal. Processing of generating a DL signal to which the spatial multiplexing technique is adapted in advance by using a channel coefficient is referred to as precoding. The base station can suppress interference between UEs in the DL communication by performing the precoding, and can communicate with the plurality of UEs. In this way, the base station can communicate with a plurality of users in the same frequency band and in the same time period, and can improve frequency use efficiency.

In the DL communication, a DL signal to which the spatial multiplexing technique is adapted in advance is transmitted by using a channel coefficient estimated from a UL signal. This uses reciprocity of a propagation channel in the UL communication and the DL communication, and is used in communication of a time division duplex (TDD) method. In order to use reciprocity of a channel in the MIMO transmission method, a transmission/reception signal being transmitted and received from each antenna needs to be calibrated. When the calibration is incomplete, an error due to a receiver is included in a channel coefficient acquired by channel estimation, and a radio signal cannot be accurately spatially multiplexed. Further, an error of a transmitter also affects spatial multiplexing and deteriorates a communication characteristic.

Thus, a base station may include a calibration transmission/reception circuit in addition to a transmission/reception circuit used in communication, and may calibrate the transmission/reception circuit used in communication by using the calibration transmission/reception circuit. In this way, calibration is achieved even after the base station is installed at an operation place, and thus a change in a transmission/reception characteristic due to a temperature and a change over time can be corrected, and the spatial multiplexing technique having a high degree of accuracy can be used. On the other hand, in the base station, the calibration transmission/reception circuit is added, and thus a cost and consumption power increase. Further, there is a base station that uses a technique referred to as hybrid beam forming acquired by combining the analog beam forming and the digital beam forming. Also in such a base station, calibration of a transmission/reception circuit is needed.

The base station associated with the MIMO transmission method is referred to as a MIMO apparatus or a MIMO base station. The MIMO apparatus is divided into two kinds. One is a collocated-MIMO (C-MIMO) apparatus in which a plurality of antenna units are installed in one housing, and the other is a distributed MIMO apparatus in which each of a plurality of antenna units is installed in an individual housing. The distributed MIMO apparatus is referred to as a distributed-MIMO (D-MIMO) apparatus. Calibration of the antenna unit is particularly considered important in the D-MIMO apparatus. The plurality of antenna units of the D-MIMO apparatus are installed in positions different from each other, and are connected to one radio unit (RU) unit in a radio manner. The RU unit includes a digital front end (DFE) that performs digital baseband signal processing, and a modulator-demodulator. Each of the plurality of antenna units includes an antenna, and an up/down converter unit that converts a DL signal from the RU into a high frequency band. In the D-MIMO apparatus, the RU and the antenna unit are separated, and thus it is difficult to calibrate, in advance, an amplitude and a phase of a DL signal at an antenna end of each of the plurality of antenna units during manufacturing. Thus, calibration of the D-MIMO apparatus needs to be performed by using an external measuring instrument after the D-MIMO apparatus is installed at an operation place. When calibration is performed by using the external measuring instrument, it is difficult to change a position of the antenna unit after the D-MIMO apparatus is installed, and it is also difficult to handle a change in a phase and an amplitude due to a temperature change of the D-MIMO apparatus and the like, and there is a problem that communication quality decreases.

Patent Literature 1 describes that "First correction information determined from first calibration of a base station is received from a system module. A signal from at least one antenna of the base station is received by a high-frequency module. Second correction information is determined based on the reception signal and the first correction information". Patent Literature 2 describes that "In a communication base station that performs adaptive array communication, during communication, calibration processing of receiving, by a remaining (N−1) antenna element, a CCH carrier transmitted by any one of N antenna elements equipped in the communication base station is performed, and calibration data about each antenna element are determined from an amplitude ratio and a phase difference during reception of each antenna element". Patent Literature 2 does not describe that "Down link (DL) control for transmitting a calibration DL signal from an antenna other than one antenna among a plurality of antennas and receiving the calibration DL signal by the one antenna, and up link (UL) control for transmitting a calibration UL signal from the one antenna and receiving the calibration UL signal by the antenna other than the one antenna are performed for each of the plurality of antennas".

CITATION LIST

Patent Literature

[PTL 1] Published Japanese Translation of PCT International Publication for Patent Application, No. 2013-535124
[PTL 2] Japanese Unexamined Patent Application Publication No. 2008-166866

SUMMARY OF INVENTION

Technical Problem

As described above, in the MIMO apparatus, calibration of a plurality of antenna units, i.e., calibration of a transmission/reception error between antennas is needed. Particularly, in the C-MIMO apparatus using the spatial multiplexing technique, a calibration feedback transmitter-receiver (transmission/reception circuit) may be added in the apparatus, and calibration may be performed by using the transmitter-receiver. When the feedback transmission/reception circuit is included, a signal wiring line from each signal path to the feedback transmission/reception circuit is also needed. Due to these, there is a problem that the C-MIMO apparatus becomes complicated, and a cost and consumption power increase. Further, in the D-MIMO apparatus, an antenna unit and a modulator-demodulator are separated, and it is difficult to perform calibration of the antenna unit during manufacturing. Thus, calibration of the antenna unit needs to be performed by using an external measuring instrument after the D-MIMO apparatus is installed at an operation place. Since it is difficult to frequently perform calibration using the external measuring instrument, it is difficult to change an installation position of the antenna unit. Further, there is a problem that it is difficult to calibrate the antenna unit each time in order to handle deterioration of a communication characteristic due to a temperature change of the D-MIMO apparatus and the like.

An object of the present disclosure is to provide a radio communication apparatus, a method for the radio communication apparatus, and a program that solve any of the problems described above.

Solution to Problem

A radio communication apparatus according to the present disclosure includes:

a calibration control unit that performs, for each of a plurality of antennas, down link (DL) control for transmitting a calibration DL signal from an antenna other than one antenna among a plurality of the antennas and receiving the calibration DL signal by the one antenna, and up link (UL) control for transmitting a calibration UL signal from the one antenna and receiving the calibration UL signal by the antenna other than the one antenna;

a calibration coefficient calculation unit that calculates a DL channel coefficient of a transmitter and a UL channel coefficient of a receiver that are connected to the antenna for each of a plurality of the antennas, based on the calibration DL signal being transmitted from a plurality of the antennas and the calibration DL signal being received by a plurality of the antennas in the DL control, and the calibration UL signal being transmitted from a plurality of the antennas and the calibration UL signal being received by a plurality of the antennas in the UL control, and calculates a calibration coefficient for calibrating a radio DL signal, based on the DL channel coefficient and the UL channel coefficient; and a calibration application unit that adjusts a phase and an amplitude of the radio DL signal being transmitted from each of a plurality of the antennas, based on the calibration coefficient.

A method for a radio communication apparatus according to the present disclosure includes:

performing, for each of a plurality of antennas, down link (DL) control for transmitting a calibration DL signal from an antenna other than one antenna among a plurality of the antennas and receiving the calibration DL signal by the one antenna, and up link (UL) control for transmitting a calibration UL signal from the one antenna and receiving the calibration UL signal by the antenna other than the one antenna;

calculating a DL channel coefficient of a transmitter and a UL channel coefficient of a receiver that are connected to the antenna for each of a plurality of the antennas, based on the calibration DL signal being transmitted from a plurality of the antennas and the calibration DL signal being received by a plurality of the antennas in the DL control, and the calibration UL signal being transmitted from a plurality of the antennas and the calibration UL signal being received by a plurality of the antennas in the UL control;

calculating a calibration coefficient for calibrating a radio DL signal, based on the DL channel coefficient and the UL channel coefficient; and adjusting a phase and an amplitude of the radio DL signal being transmitted from each of a plurality of the antennas, based on the calibration coefficient.

A program according to the present disclosure causes a computer to execute:

performing, for each of a plurality of antennas, down link (DL) control for transmitting a calibration DL signal from an antenna other than one antenna among a plurality of the antennas and receiving the calibration DL signal by the one antenna, and up link (UL) control for transmitting a calibration UL signal from the one antenna and receiving the calibration UL signal by the antenna other than the one antenna;

calculating a DL channel coefficient of a transmitter and a UL channel coefficient of a receiver that are connected to the antenna for each of a plurality of the antennas, based on the calibration DL signal being transmitted from a plurality of the antennas and the calibration DL signal being received by a plurality of the antennas in the DL control, and the calibration UL signal being transmitted from a plurality of the antennas and the calibration UL signal being received by a plurality of the antennas in the UL control;

calculating a calibration coefficient for calibrating a radio DL signal, based on the DL channel coefficient and the UL channel coefficient; and adjusting a phase and an amplitude of the radio DL signal being transmitted from each of a plurality of the antennas, based on the calibration coefficient.

Advantageous Effects of Invention

The present disclosure is able to provide a radio communication apparatus, a method for the radio communication apparatus, and a program that can easily perform calibration of a distributed antenna.

BRIEF DESCRIPTION OF DRAWINGS

FIG. 1 is a block diagram illustrating a radio communication apparatus according to a first example embodiment;

EXAMPLE EMBODIMENT

Figure 2:
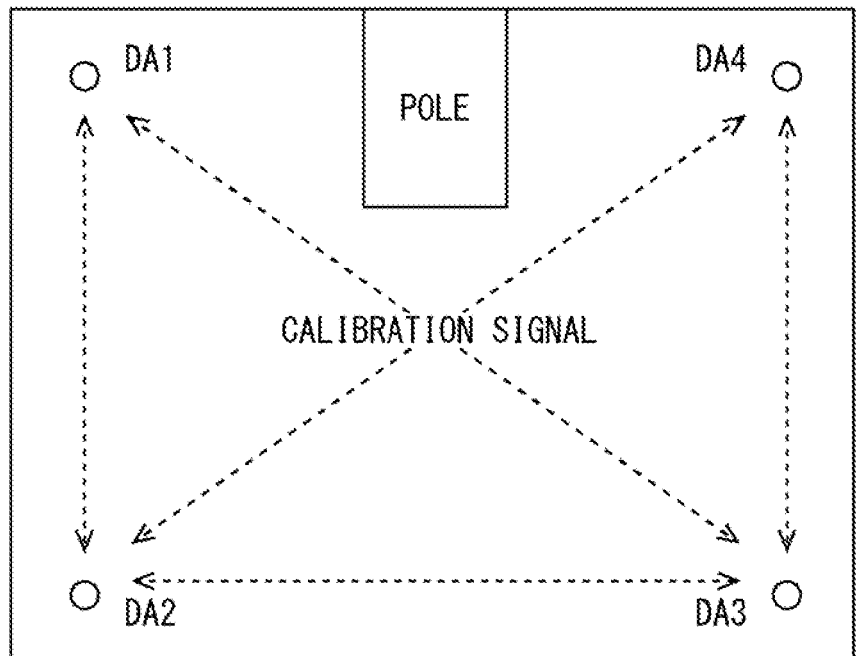
FIG. 2 is a schematic diagram illustrating installation of a distributed antenna according to the first example embodiment.

Example embodiments of the present disclosure will be described below with reference to the drawings. In each of the drawings, the same or corresponding elements will be denoted by the same reference signs, and duplicate description will be omitted depending on need for the sake of clarity of explanation.

First Example Embodiment

Overview of Configuration of Radio Communication Apparatus

FIG. 1 is a block diagram illustrating a radio communication apparatus according to a first example embodiment. FIG. 1 illustrates a minimum configuration of the radio communication apparatus according to the first example embodiment.

The radio communication apparatus may be referred to as a D-MIMO apparatus.

In the first example embodiment, distributed antennas of the D-MIMO apparatus will be described as an example of a plurality of antennas, which are not limited thereto.

As illustrated in FIG. 1, a radio communication apparatus 11 according to the first example embodiment includes a calibration control unit 111, a calibration coefficient calculation unit 112, and a calibration application unit 113.

The calibration control unit 111 performs down link (DL) control for transmitting a calibration DL signal from an antenna other than one antenna among a plurality of distributed antennas DA, and receiving the calibration DL signal by the one antenna. In other words, the one antenna among the plurality of distributed antennas DA is used as a calibration antenna. The one antenna is, for example, a distributed antenna DAL The calibration control unit 111 performs up link (UL) control for transmitting a calibration UL signal from the one antenna, and receiving the calibration UL signal by the antenna other than the one antenna. The calibration control unit 111 performs the DL control and the UL control for each of the plurality of distributed antennas DA.

The calibration coefficient calculation unit 112 calculates a DL channel coefficient of a transmitter and a UL channel coefficient of a receiver being connected to the distributed antenna for each of the plurality of distributed antennas, based on the calibration DL signal being transmitted from the plurality of distributed antennas DA and the calibration DL signal being received by the plurality of distributed antennas DA in the DL control, and the calibration UL signal being transmitted from the plurality of distributed antennas DA and the calibration UL signal being received by the plurality of distributed antennas in the UL control. The calibration coefficient calculation unit 112 calculates a calibration coefficient for calibrating a radio DL signal, based on the DL channel coefficient and the UL channel coefficient.

The calibration coefficient calculation unit 112 may calculate a transmission/reception gain ratio for each of the plurality of distributed antennas DA on an assumption that a DL propagation channel included in the DL channel coefficient is equal to a UL propagation channel included in the UL channel coefficient, based on the DL channel coefficient and the UL channel coefficient, and may set the transmission/reception gain ratio as a calibration coefficient for calibrating the radio DL signal.

The calibration application unit 113 adjusts a phase and an amplitude of the radio DL signal being transmitted from each of the plurality of distributed antennas, based on the calibration coefficient. The radio DL signal may be referred to as a DL signal.

The radio communication apparatus 11 according to the first example embodiment performs a calibration measurement by using one antenna among the plurality of distributed antennas DA as a calibration antenna. The calibration measurement is performed for a plurality of times while the one distributed antenna DA used as the calibration antenna described above is changed to one distributed antenna DA among the plurality of distributed antennas DA. In this way, according to the first example embodiment, calibration of the distributed antenna DA can be performed without an external measuring instrument, a calibration-specific antenna, or a calibration-specific circuit. As a result, a radio communication apparatus, a method for the radio communication apparatus, and a program that can easily perform calibration of the distributed antenna can be provided.

The calibration coefficient calculation unit 112 calculates, for each of the plurality of distributed antennas DA, a plurality of DL channel coefficients that each include a characteristic (propagation channel) of DL radio wave propagation and a transmission characteristic of the distributed antenna DA, and are associated with an antenna other than one antenna, based on the calibration DL signal during transmission being transmitted from the antenna other than the one antenna and the calibration DL signal during reception being received by the one antenna. Calculation of the DL channel coefficient described above is also performed on a plurality of calibration measurements being performed while the calibration antenna described above is changed.

The calibration coefficient calculation unit 112 calculates, for each of the plurality of distributed antennas DA, a plurality of UL channel coefficients that each include a characteristic (propagation channel) of UL radio wave propagation and a reception characteristic of the distributed antenna DA, and are associated with an antenna other than one antenna, based on the calibration UL signal during transmission being transmitted from the one antenna and the calibration UL signal during reception being received by the antenna other than the one antenna. Calculation of the UL channel coefficient described above is also performed on a plurality of calibration measurements being performed while the calibration antenna described above is changed.

The calibration coefficient calculation unit 112 calculates a ratio (UL/DL channel coefficient ratio) ratio of the DL channel coefficient to the UL channel coefficient for each of the plurality of calibration measurements and for each of the plurality of distributed antennas DA, based on the plurality of DL channel coefficients and the plurality of UL channel coefficients for each of the plurality of calibration measurements and for each of the plurality of distributed antennas DA. The calibration coefficient calculation unit 112 calculates a calibration coefficient for calibrating a radio DL signal, based on the DL channel coefficient and the UL channel coefficient. The DL channel coefficient and the UL channel coefficient also include a transmission/reception characteristic of the distributed antenna DA. However, it is assumed that a propagation channel included in the DL channel coefficient is equal to a propagation channel included in the UL channel coefficient. In other words, it is assumed that the propagation channels are equal since the DL and the UL are the same propagation path.

The calibration coefficient calculation unit 112 calculates a ratio between a UL/DL channel coefficient ratio between a calibration antenna in a reference calibration measurement among calibration measurements for a plurality of times and a reference distributed antenna, and a UL/DL channel coefficient ratio between a calibration antenna in a calibration measurement other than the reference calibration measurement and the reference distributed antenna. The ratio is referred to as a correction coefficient of a calibration measurement.

By using a correction coefficient between a plurality of calibration measurements, a proportion of the DL channel coefficient to the UL channel coefficient is corrected for the plurality of calibration measurements.

The reference distributed antenna described above may include a plurality of reference distributed antennas, and an average of correction coefficients calculated by the plurality of reference distributed antennas described above may be newly set as a correction coefficient.

The calibration coefficient calculation unit 112 performs calibration measurements for a plurality of times, and obtains a weighted coefficient, based on received power of a calibration DL signal or a calibration UL signal, when a plurality of DL channel coefficients and UL channel coefficients are acquired (when there are a plurality of effective measurements) for one distributed antenna DA.

The calibration coefficient calculation unit 112 calculates a UL/DL channel coefficient ratio for each of the calibration measurements from the DL channel coefficient and the UL channel coefficient described above.

The calibration coefficient calculation unit 112 performs, by using the correction coefficient described above, correction between the calibration measurements on the UL/DL channel coefficient ratio for each of the calibration measurements described above.

The calibration coefficient calculation unit 112 calculates, for each of the plurality of distributed antennas DA, a weighted average UL/DL channel coefficient ratio in which weighted averaging between the plurality of calibration measurements based on the weighted coefficient is performed on the UL/DL channel coefficient ratio for each of the corrected calibration measurements.

The weighted average UL/DL channel coefficient ratio is referred to as a calibration coefficient.

The calibration coefficient calculation unit 112 selects the DL channel coefficient associated with the calibration DL signal whose received power is equal to or more than predetermined power from the DL channel coefficients in the plurality of measurements. The calibration coefficient calculation unit 112 selects the DL channel coefficient associated with the calibration UL signal whose received power is equal to or more than predetermined power from the UL channel coefficients in the plurality of measurements. The calibration coefficient calculation unit 112 may calculate a calibration coefficient for each of the plurality of distributed antennas DA by using the selected DL channel coefficient and the selected UL channel coefficient.

The calibration control unit 111 may add the calibration DL signal or the calibration UL signal to the radio DL signal being transmitted from each of the plurality of distributed antennas, and perform a calibration measurement.

Overview of Operation of Radio Communication Apparatus

Hereinafter, a D-MIMO apparatus will be described as an example of one radio communication apparatus. Further, the D-MIMO apparatus 11 that is associated with the MIMO transmission and uses the TDD method will be described as an example.

FIG. 2 is a schematic diagram illustrating installation of the distributed antenna according to the first example embodiment.

Figure 3:
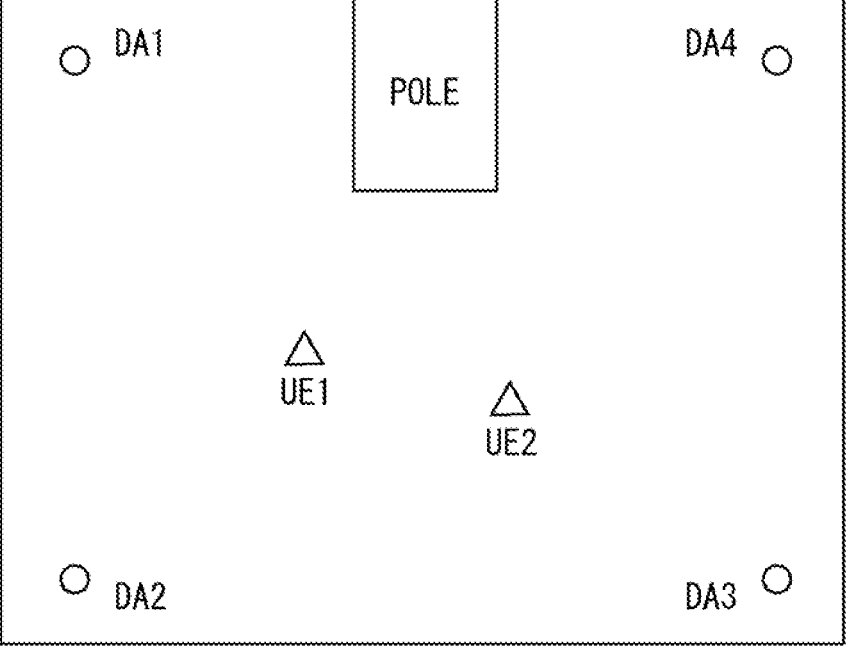
FIG. 3 is a schematic diagram illustrating installation of the distributed antenna according to the first example embodiment.

FIG. 3 is a schematic diagram illustrating installation of the distributed antenna according to the first example embodiment.

FIGS. 2 and 3 are diagrams when an operation place, for example, indoor installation of the distributed antenna of the D-MIMO apparatus according to the first example embodiment is viewed from above.

FIG. 2 illustrates a communication state during calibration. FIG. 3 illustrates a communication state during operation. In the first example embodiment, it is assumed that the number of the distributed antennas DA is four, and the distributed antennas DA are installed in four corners in a room. As illustrated in FIG. 2, a radio wave transmitted from the distributed antenna DA1 is blocked by a pole and does not thus reach a distributed antenna DA4 and vice versa. Further, a dotted line illustrated in FIG. 2 indicates that the plurality of distributed antennas DA can communicate with each other.

It is assumed that all of the distributed antenna DA1 to a distributed antenna DA4 are calibrated. Calibration is performed by transmitting and receiving a calibration signal being a known calibration signal by the distributed antennas DA. In the first example embodiment, calibration can be performed by using an external measuring instrument and user equipment (UE), but it is assumed that calibration is performed by only the distributed antennas DA.

In the method for performing calibration by the distributed antennas DA according to the first example embodiment, transmission and reception of all of the distributed antennas DA are not switched at the same timing unlike a normal operation. In the first example embodiment, transmission or reception of one of any distributed antennas DA is operated in an opposite manner to the other distributed antenna DA. In other words, one distributed antenna DA is used like an external measuring instrument. The one distributed antenna DA is referred to as a calibration antenna. In this way, calibration can be performed only with the D-MIMO apparatus 11.

The distributed antennas DA of the D-MIMO apparatus 11 according to the first example embodiment are installed at various places depending on an operation place. Thus, as in the distributed antenna DA1 and the distributed antenna DA4 illustrated in FIG. 2, a signal may not reach each antenna. Thus, calibration (measurement) using a calibration signal of the D-MIMO apparatus 11 is performed for a plurality of times by changing the distributed antenna DA used as the calibration antenna. The D-MIMO apparatus 11 obtains a calibration coefficient for calibrating a transmission portion of the D-MIMO apparatus 11 by using measurement results for a plurality of times. Subsequently, the D-MIMO apparatus 11 performs calibration by adding the obtained calibration coefficient to a DL signal to be transmitted from each of the distributed antennas DA.

Details of Configuration of Radio Communication Apparatus

Figure 4:
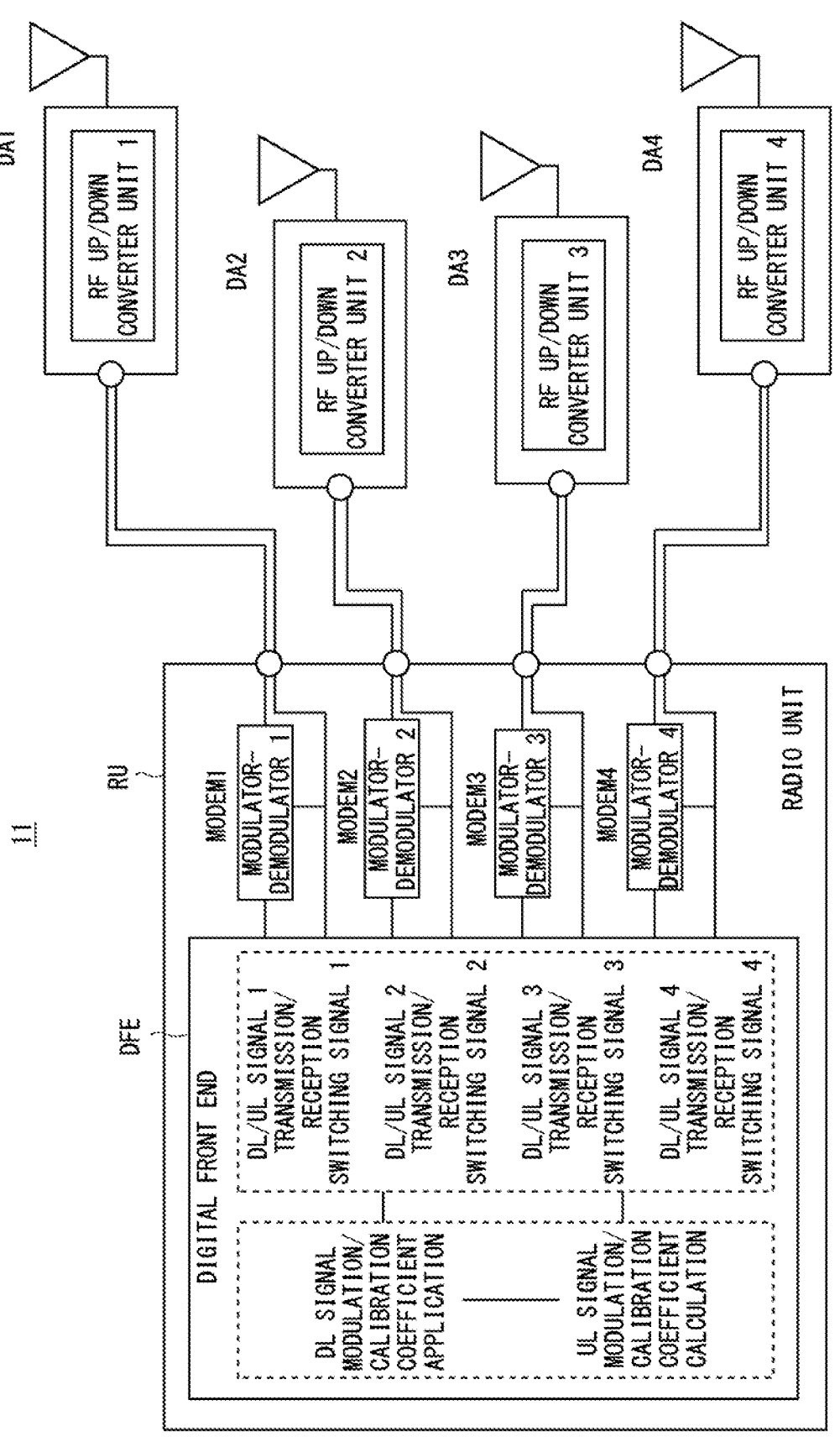
FIG. 4 is a block diagram illustrating a configuration of a D-MIMO apparatus according to the first example embodiment.

FIG. 4 is a block diagram illustrating a configuration of the D-MIMO apparatus according to the first example embodiment.

Figure 5:
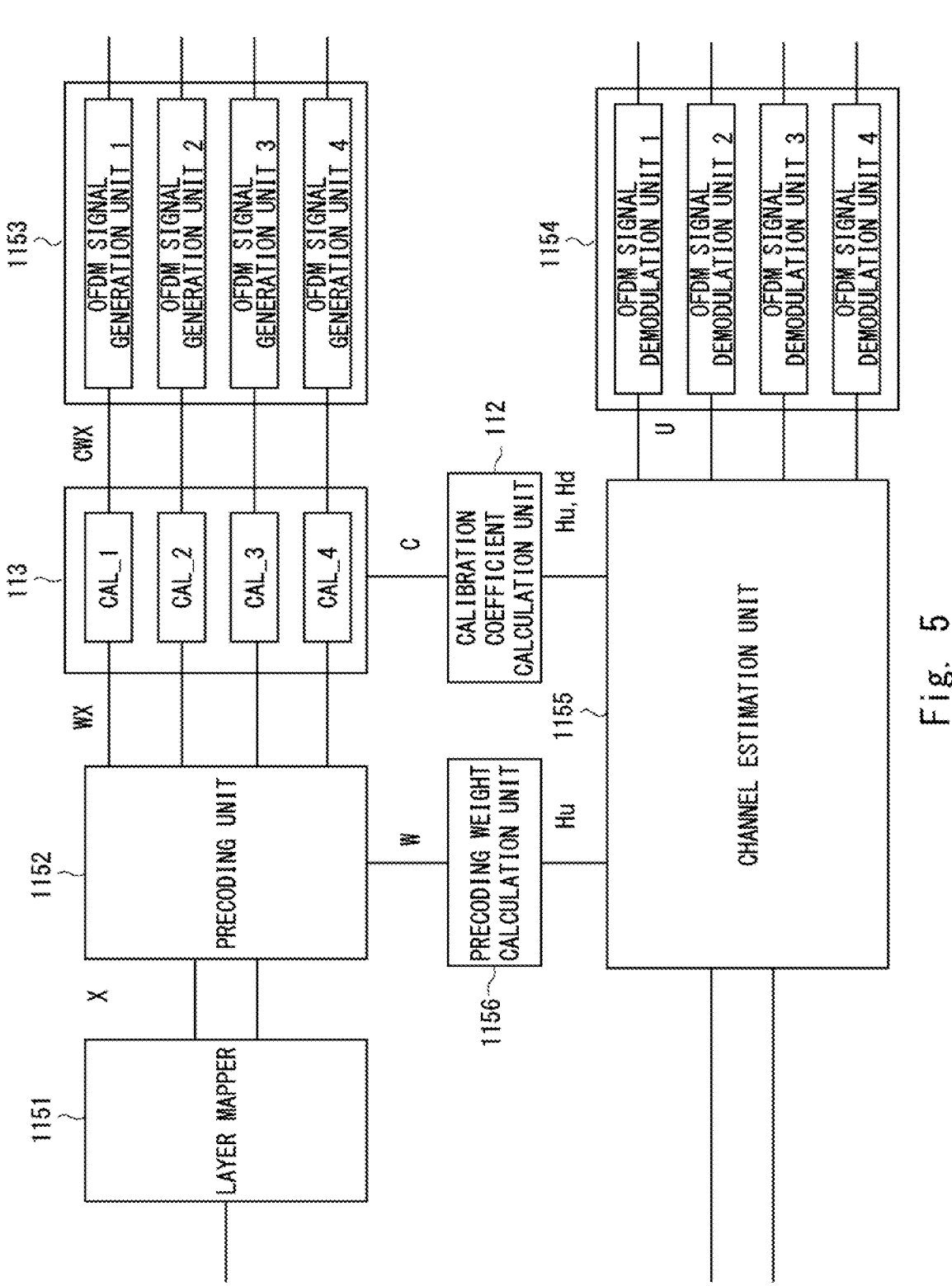
FIG. 5 is a block diagram illustrating a digital front end DFE according to the first example embodiment.

FIG. 5 is a block diagram illustrating a digital front end DFE according to the first example embodiment.

As illustrated in FIG. 4, the D-MIMO apparatus 11 according to the first example embodiment includes a distributed antenna unit DA1, a distributed antenna unit DA2, a distributed antenna unit DA3, a distributed antenna unit DA4, and a radio unit RU. Each of the distributed antenna units DA mainly includes an antenna and an RF up/down converter unit. The distributed antenna unit D1, the distributed antenna unit DA2, the distributed antenna unit DA3, and the distributed antenna unit DA4 are collectively referred to as the distributed antenna unit DA.

The digital front end DFE illustrated in FIG. 4 includes the calibration control unit 111, the calibration coefficient calculation unit 112, and the calibration application unit 113 illustrated in FIG. 1. The RF up/down converter unit of the distributed antenna unit DA illustrated in FIG. 4 is included in a transmitter-receiver 114 illustrated in FIG. 1.

The radio unit RU converts a digital signal being a transmission signal into an analog signal in the down link (DL) communication, and converts an analog signal being a reception signal into a digital signal in the up link (UL) communication. The radio unit RU and each of the four distributed antenna units DA (from the distributed antenna unit DA1 to the distributed antenna unit DA4) are connected by a cable. The distributed antenna unit DA can be freely installed within a range reached by the cable. In the first example embodiment, the number of the distributed antenna units DA is four, which is not limited thereto. The number of the distributed antenna units DA may be three or more.

The radio unit RU includes the digital front end DFE that performs digital signal processing, and a modulator-demodulator MODEM that converts a digital signal and an analog modulation signal. The radio unit RU includes four modulator-demodulators MODEM in the same number as the number of the distributed antenna units DA, and performs digital beam forming. The radio unit RU and the four distributed antenna units DA are connected by a coaxial cable, and transmit an analog modulation signal by using the coaxial cable.

The distributed antenna unit DA performs up-conversion on an analog modulation signal transmitted from the radio unit RU into an RF signal in the RF up/down converter unit RF, and then transmits the RF signal from the antenna. Further, the distributed antenna unit DA performs down-conversion on a signal received by the antenna into an analog modulation signal in the RF up/down converter unit RF, and then transmits the analog modulation signal to the radio unit RU.

Processing of a DL signal of the digital front end DFE will be indicated below.

As illustrated in FIG. 5, in the processing of a DL signal, the digital front end DFE divides a transmission signal for each layer in a layer mapper unit 1151, and outputs a layer signal X. In this example, it is assumed that a layer number is two, for example. A precoding unit 1152 generates four DL signals WX by assigning a weight to each layer signal X according to a precoding weight coefficient W and adding each other. The calibration application unit 113 multiplies the DL signal WX after the precoding by a coefficient C that calibrates an error of the transmitter-receiver, and outputs a DL signal CWX. An OFDM signal generation unit 1153 performs OFDM modulation on the DL signal CWX subjected to the precoding and the calibration, and generates a digital baseband signal. The digital baseband signal is transmitted to the modulator-demodulator MODEM, and is converted into an analog modulation signal.

Processing of a UL signal of the digital front end DFE will be indicated below.

An OFDM signal demodulation unit 1154 performs demodulation processing on a received baseband signal (OFDM signal) being input from the modulator-demodulator MODEM, and outputs a signal U. In this way, the received baseband signal is converted from a signal in a time domain into a signal in a frequency domain. In other words, the received baseband signal is converted into a signal for each subcarrier. The signal U subjected to the OFDM demodulation is a signal having a phase and an amplitude changing due to an influence of interference between pieces of multiplexing communication with a plurality of UE, a propagation environment, and the like.

A channel estimation unit 1155 obtains channel coefficients $H_u$ and $H_d$ of a propagation path (communication path) by using a known reference signal included in the OFDM signal or a distributed antenna unit DA calibration signal. The channel coefficient obtained by channel estimation from the UL signal or a distributed antenna unit DA calibration UL signal is assumed to be $H_u$. The channel coefficient obtained by channel estimation from a distributed antenna unit DA calibration DL signal is assumed to be $H_d$. The D-MIMO apparatus 11 removes signal interference and corrects a change in phase and amplitude by a spatial multiplexing technique by using the channel coefficient $H_u$, and acquires the UL signal for each layer.

A precoding weight calculation unit 1156 calculates the precoding weight coefficient W for the DL from the channel coefficient $H_u$ obtained in the channel estimation unit 1155 by using the spatial multiplexing technique. The calibration coefficient calculation unit 112 calculates the calibration coefficient C by using the channel coefficients $H_u$ and $H_d$. The calibration application unit 113 performs calibration of the DL signal by using the calibration coefficient C.

Details of Operation of Radio Communication Apparatus

Figure 6:
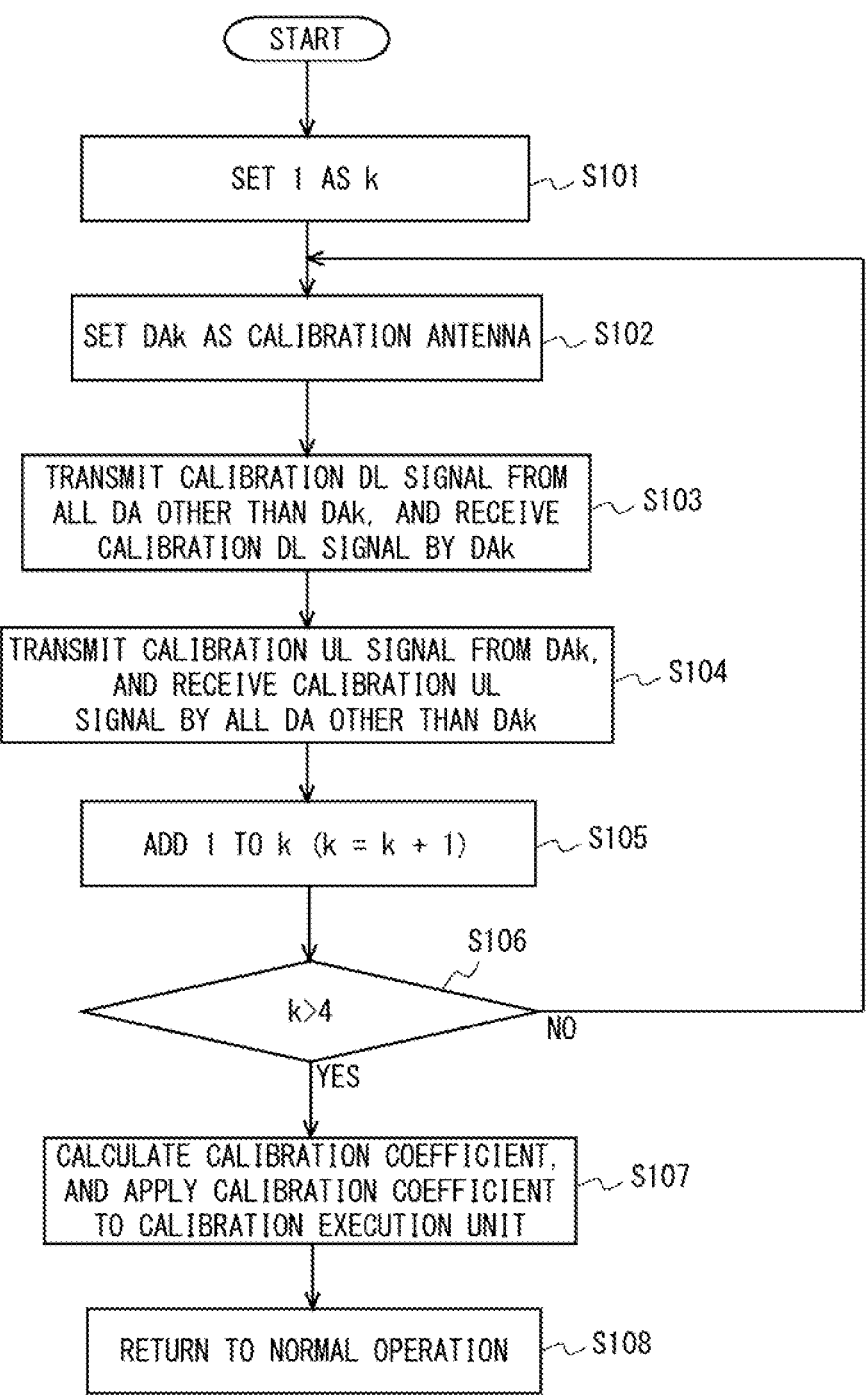
FIG. 6 is a flowchart illustrating an operation of the D-MIMO apparatus according to the first example embodiment.

FIG. 6 is a flowchart illustrating an operation of the D-MIMO apparatus according to the first example embodiment.

FIG. 6 illustrates an operation of the D-MIMO apparatus according to the first example embodiment during calibration.

Figure 7:
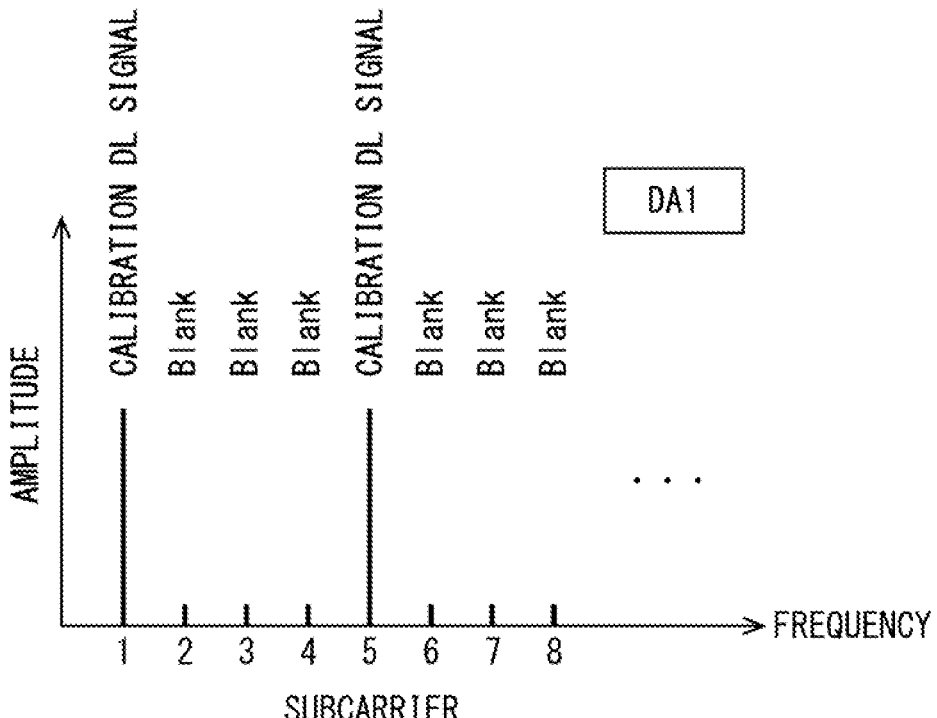
FIG. 7 is a schematic diagram illustrating a frequency arrangement of a calibration DL signal according to the first example embodiment.

FIG. 7 is a schematic diagram illustrating a frequency arrangement of a calibration DL signal according to the first example embodiment.

FIG. 7 illustrates the frequency arrangement of the calibration DL signal being transmitted from the distributed antenna DA1.

Figure 8:
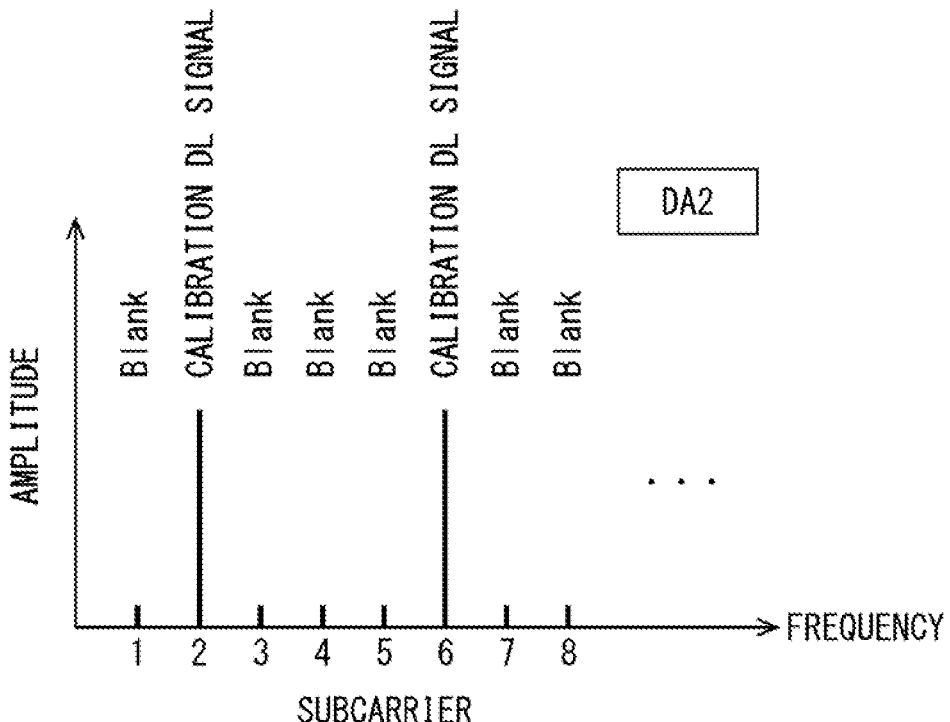
FIG. 8 is a schematic diagram illustrating a frequency arrangement of a calibration DL signal according to the first example embodiment.

FIG. 8 is a schematic diagram illustrating a frequency arrangement of a calibration DL signal according to the first example embodiment.

FIG. 8 illustrates the frequency arrangement of the calibration DL signal being transmitted from the distributed antenna DA2.

Figure 9:
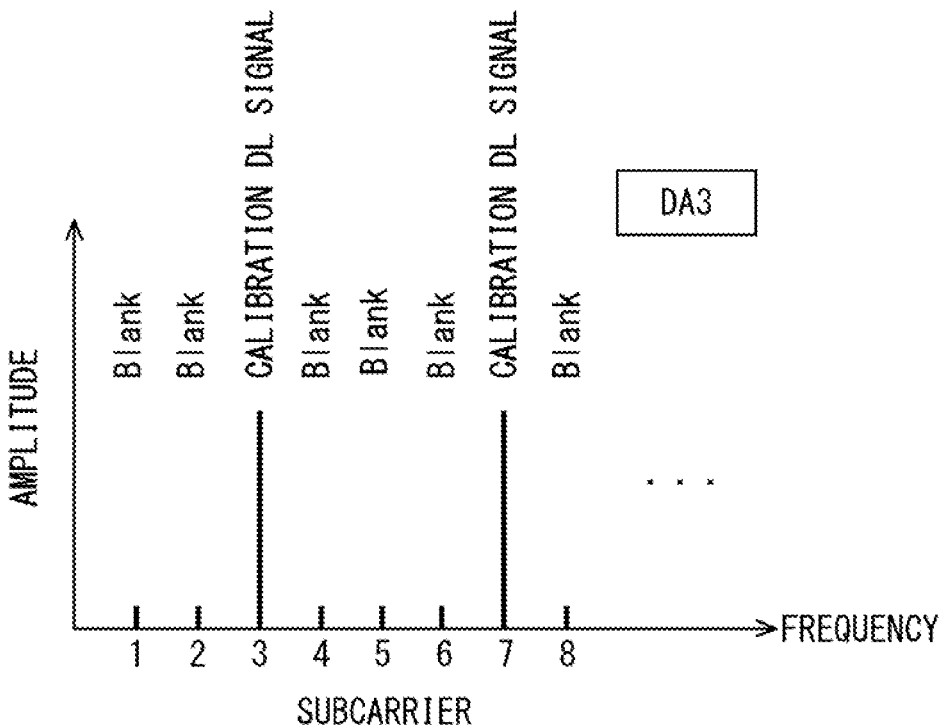
FIG. 9 is a schematic diagram illustrating a frequency arrangement of a calibration DL signal according to the first example embodiment.

FIG. 9 is a schematic diagram illustrating a frequency arrangement of a calibration DL signal according to the first example embodiment.

FIG. 9 illustrates the frequency arrangement of the calibration DL signal being transmitted from the distributed antenna DA3.

Figure 10:
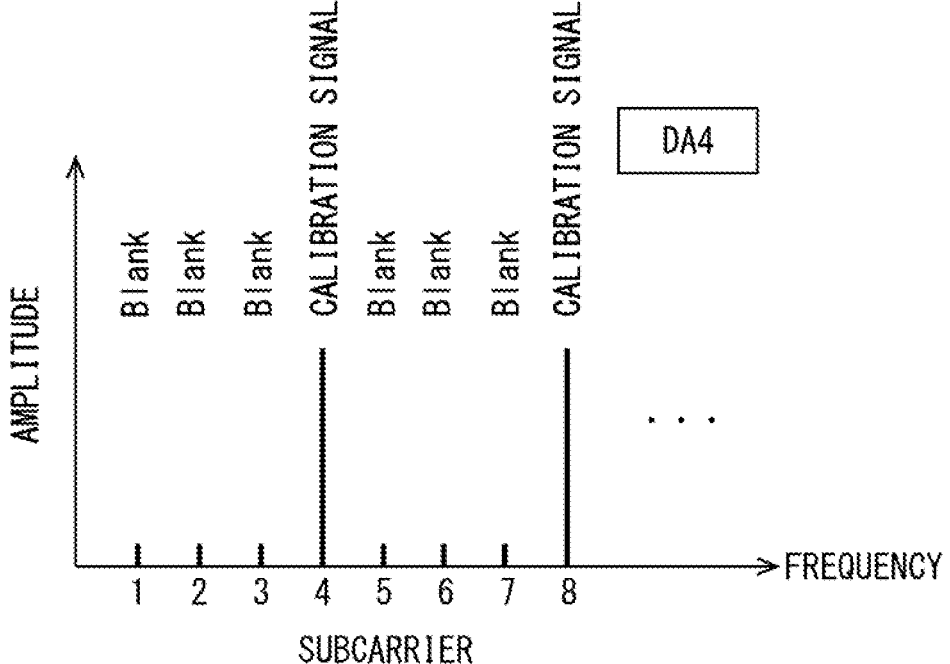
FIG. 10 is a schematic diagram illustrating a frequency arrangement of a calibration DL signal according to the first example embodiment.

FIG. 10 is a schematic diagram illustrating a frequency arrangement of a calibration DL signal according to the first example embodiment.

FIG. 10 illustrates the frequency arrangement of the calibration DL signal being transmitted from the distributed antenna DA4.

Figure 11:
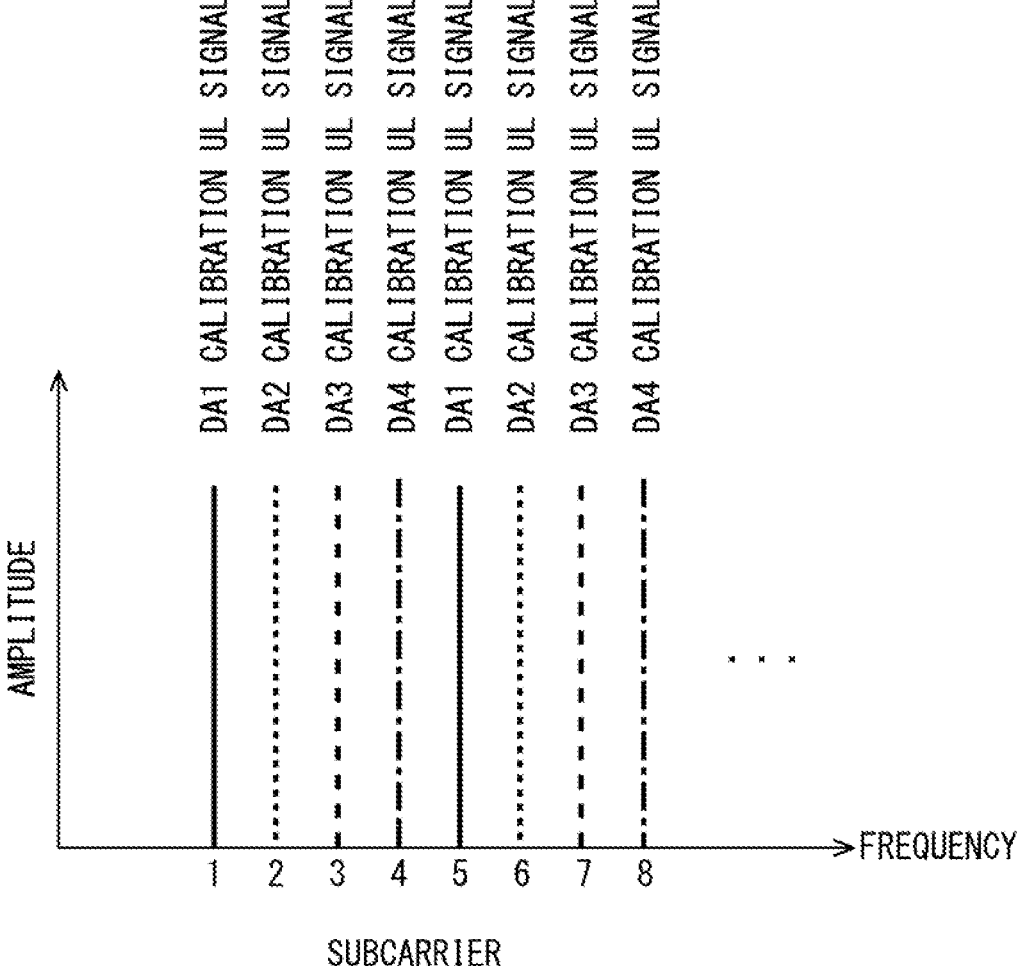
FIG. 11 is a schematic diagram illustrating a frequency arrangement of a calibration UL signal according to the first example embodiment.

FIG. 11 is a schematic diagram illustrating a frequency arrangement of a calibration UL signal according to the first example embodiment.

The D-MIMO apparatus 11 may start a calibration operation, i.e., an operation of adjusting a phase and an amplitude of a DL signal with, as an opportunity, any operation indicated below.

At a time of activation (at a time of turning-on) of the D-MIMO apparatus 11.

When a difference between a temperature of any of the plurality of distributed antennas DA and a temperature during previous calibration is equal to or more than a predetermined temperature, or when a difference between an average temperature of all of the distributed antennas DA and a temperature during previous calibration is equal to or more than the predetermined temperature.

When a predetermined time or longer has elapsed since previous calibration.

When communication quality of a DL signal is lower than predetermined quality during a predetermined period or longer.

With the operation described above as an opportunity, as illustrated in FIG. 6, 1 is set as a variable k (step S101). Note that the variable k is assumed to be an integer.

Since the variable k=1, a distributed antenna DAk is the distributed antenna DA1. The distributed antenna DA1 is set as a calibration antenna, and a calibration measurement is performed by using the distributed antenna DA1 (step S102). Note that a k-th distributed antenna DA is assumed to be the distributed antenna DAk.

A known calibration DL signal is transmitted from all of the distributed antennas DA other than the distributed antenna DAk, and is received by the distributed antenna DAk (step S103). In order to avoid interference between the distributed antennas DA, an OFDM signal disposed at a frequency (subcarrier) different for each of the plurality of distributed antennas DA is used as the calibration DL signal.

As illustrated in FIGS. 7 to 10, the calibration DL signal disposed in a subcarrier different for each of the plurality of distributed antennas DA is assigned. One subcarrier in four subcarriers is disposed for the calibration DL signal. The calibration DL signal is not transmitted from the distributed antenna DAk used as the calibration antenna. The calibration DL signal (data) being transmitted from the distributed antenna DA other than the distributed antenna DAk used as the calibration antenna and received and measured by the distributed antenna DAk is demodulated similarly to a time of reception of a normal OFDM signal, subjected to channel estimation, and then held in a storage unit (not illustrated). In this example, the example from the distributed antenna DA1 to the distributed antenna DA4 is illustrated, which is not limited thereto.

After step S103, a known calibration UL signal is transmitted from the distributed antenna DAk, and is received by the distributed antennas DA other than the distributed antenna DAk (step S104).

As illustrated in FIG. 11, the calibration UL signal is different from the calibration DL signal, and does not change a subcarrier disposed for each of the distributed antennas DA. Subcarrier mapping (frequency arrangement) of the calibration UL signal is different from that of the calibration DL signal, and the calibration UL signal is disposed in all subcarriers. The calibration UL signal (data) being received by each of the distributed antennas DA is demodulated similarly to a time of reception of a normal OFDM signal, subjected to channel estimation, and then held in the storage unit.

After step S104, 1 is added to the variable k (step S105).

When the variable k is equal to or less than 4 (step S106: No), the processing returns to step S102. Further, when the variable k is greater than 4 (step S106: Yes), the processing proceeds to step S107. In the first example embodiment, a measurement is performed in such a way that the calibration antenna is set from the distributed antenna DA1 in order, and all of the distributed antennas DA are used once as the calibration antenna.

After Yes in step S106, a calibration coefficient is calculated based on the calibration DL signal or the calibration UL signal (data) being measured by repeating step S103 and step S104, and is applied to the calibration application unit 113 (step S107).

After step S107, a measurement for calibration coefficient calculation ends, and the processing returns to a normal operation (step S108).

Calculation Method of Calibration Coefficient

Herein, a calculation method of a calibration coefficient performed in step S107 illustrated in FIG. 6 will be described.

As illustrated in FIGS. 7 to 10, the calibration DL signal output from the distributed antenna DA is disposed in a subcarrier different for each of the plurality of distributed antennas DA. For example, the calibration DL signal transmitted from the distributed antenna DA2 to the distributed antenna DA4 is received by the distributed antenna DA1 as the calibration antenna. The calibration DL signal is subjected to OFDM modulations and divided for each subcarrier, and is thus received without interference between the plurality of distributed antennas DA.

Herein, a subcarrier used for communication with an i-th distributed antenna DAi is assumed to be $s_i$. The calibration DL signal and the calibration UL signal may be collectively referred to as a calibration signal.

In the first example embodiment, the variable i is assumed to be an integer from 1 to 4. As illustrated in FIGS. 7 to 10, a subcarrier $s_1$ is, for example, a first, fifth, ninth, . . . subcarrier. A subcarrier $s_2$ is, for example, a second, sixth, tenth . . . subcarrier. Data about an $s_i$-th subcarrier being acquired by demodulating an OFDM signal received by the k-th calibration antenna are assumed to be represented as $d_{k,i}(s_i)$. When k=i, it is assumed that $d_{k,i}(s_i)=0$.

In a measurement of the calibration UL signal, a signal of an $s_i$-th subcarrier of the calibration UL signal being acquired by transmitted from the k-th distributed antenna DAk and received by the i-th distributed antenna DAi is assumed to be $u_{k,i}(s_i)$. When k=i, it is assumed that $u_{k,i}(s_i)=0$. As illustrated in FIG. 11, the calibration UL signal is disposed in all subcarriers, and calculation of a calibration coefficient is performed by using a subcarrier used for the calibration DL signal of each of the distributed antennas DA.

In the first example embodiment, a measurement of the calibration DL signal and a measurement of the calibration UL signal are each performed for four times by changing the calibration antenna. Since the calibration antenna is changed, a transmission/reception characteristic varies by each calibration antenna. A transmission complex gain of the k-th calibration antenna is assumed to be $\varepsilon_{k,t}$, and a reception complex gain is assumed to be $\varepsilon_{k,r}$. The gain herein is a value represented by a complex number, and includes information about an amplitude and a phase. Thus, the gain is referred to as the transmission complex gain and the reception complex gain, which may be referred to as a transmission gain and a reception gain by omitting "complex" in the following description.

Similarly, an error is also present in the individual distributed antenna DA. A transmission complex gain of the i-th calibration antenna is assumed to be $e_{i,t}$, and a reception complex gain is assumed to be $e_{i,r}$. An object of the first example embodiment is to correct an influence of the gain on a DL signal during operation. In the first example embodiment, since one of the distributed antennas DA is used as the calibration antenna, when k=i, the transmission gain $\varepsilon_{k,t}$ and the transmission gain $e_{i,t}$ are equal or the reception gain $\varepsilon_{k,r}$ and the reception gain $e_{i,r}$ are equal. However, the gains may be different in a second example embodiment and a third example embodiment described below, and are thus handled as different gains.

The calibration DL signal $d_{k,i}(s_i)$ measured for a k-th time can be represented as follows.

$$d_{k,i}(S_i) = \varepsilon_{k,r}(s_i) \cdot h_{k,i}(s_i) \cdot e_{i,t}(s_i) \cdot x_i(s_i) \tag{1}$$

$h_{k,i}$ is a channel coefficient of a propagation path from the distributed antenna DAi to the distributed antenna DAk, and $x_i$ is a known calibration DL signal transmitted from the distributed antenna DAi. ($s_i$) in an equation (1) indicates to be changed depending on a frequency (subcarrier), but will be omitted from description below for simplification. Further, the calibration DL signal $d_{k,i}(s_i)$ is measured by over the air (OTA) and thus includes noise, which will be omitted in this example.

Similarly, the signal $u_{k,i}(s_i)$ received by the i-th distributed antenna DAi in the calibration UL signal measured for the k-th time can be represented as follows.

$$u_{k,i}(s_i) = e_{i,r}(s_i) \cdot h_{k,i}(s_i) \cdot \varepsilon_{k,t}(s_i) \cdot y_k(s_i) \tag{2}$$

$y_k$ is a known calibration UL signal being transmitted from the calibration antenna CAk. ($s_i$) in an equation (2) indicates to be changed depending on a frequency (subcarrier), but will be omitted from description below for simplification. Further, the calibration UL signal $u_{k,i}(s_i)$ is measured by OTA and thus includes noise, which will be omitted in this example.

The channel coefficients $h_{k,i}$ included in the measured calibration DL signal $d_{k,i}$ and the measured UL signal $u_{k,i}$ are assumed to be equal on an assumption that the calibration signals propagate through the same propagation path. Channel estimation is performed from each of the equation (1) and the equation (2). A channel coefficient estimated from the calibration DL signal $d_{k,i}$ is assumed to be $h_{d,k,i}$.

$$h_{d,k,i} = d_{k,i} \cdot x_i^* \tag{3}$$
$$= \varepsilon_{k,r} \cdot h_{k,i} \cdot e_{i,t} \tag{4}$$

The known calibration DL signal $x_i$ is assumed to be $x_i \cdot x_i^* = 1$. (*) represents a conjugate complex number.

Similarly, a channel coefficient $h_{u,k,i}$ estimated from the calibration UL signal is calculated as in an equation (5) or an equation (6).

$$h_{u,k,i} = u_{k,i} \cdot y_k^* \tag{5}$$

$$= e_{i,r} \cdot h_{k,i} \cdot \varepsilon_{k,t} \tag{6}$$

The known calibration UL signal $y_k$ is assumed to be $y_k \cdot y_k^* = 1$.

A correction coefficient $\gamma_k$ that corrects the transmission gain $\varepsilon_{k,t}$ and the reception gain $\varepsilon_{k,r}$ of the k-th calibration antenna is obtained from the channel coefficient $h_{d,k,i}$ and the channel coefficient $h_{u,k,i}$ obtained in an equation (3) and the equation (5). The correction coefficient $\gamma_k$ is obtained with reference to any measurement of k=1 to 4. Hereinafter, a calibration signal (data) being acquired by communicating with an i0-th distributed antenna DAi0 in a k0-th measurement is used as a reference.

$$\gamma_k = \frac{h_{u,k,i0} \cdot h_{d,k0,i0}}{h_{d,k,i0} \cdot h_{u,k0,i0}} \tag{7}$$

$$= \frac{\varepsilon_{k,t} \cdot \varepsilon_{k0,r}}{\varepsilon_{k,r} \cdot \varepsilon_{k0,t}} \tag{8}$$

k, k0, and i0 are assumed to be different numbers.

In an equation (7) and an equation (8), the correction coefficient $\gamma_k$ is obtained from only a measurement result of the i0-th distributed antenna DAi0, but the correction coefficient $\gamma_k$ may be calculated by calculating the calibration signal described above from communication with the plurality of distributed antennas DA by changing a number of i0, and taking an average. The correction coefficient $\gamma_k$ is calculated for all k (in this example, 1 to 4). However, the number i0 of the distributed antenna DAi0 may be changed each time a value of k changes. A k0-th correction coefficient $\gamma_{k0}$ being a reference is assumed to be 1.

A radio wave may not be reached depending on an arrangement of the calibration antenna used for the k-th time and the k0-th calibration antenna being the reference, and a calibration signal (data) may not be able to be acquired. A number of the distributed antenna DA to which the radio wave from the calibration antenna being the reference is not reached is assumed to be newly set as k'. Such a k'-th correction coefficient $\varepsilon_{k+}$ is obtained as in an equation (9) and an equation (10) by using a k1-th measurement in which a correction coefficient is already obtained.

$$\gamma_{k'} = \frac{h_{u,k',i0} \cdot h_{d,k1,i0}}{h_{d,k',i0} \cdot h_{u,k1,i0}} \gamma_{k1} \tag{9}$$

$$= \frac{\varepsilon_{k',t} \cdot \varepsilon_{k0,r}}{\varepsilon_{k',r} \cdot \varepsilon_{k0,t}} \tag{10}$$

As in the equation (7) and the equation (9), two propagation paths are needed in order to obtain the correction coefficient $\gamma_k$. When the propagation path is one or less, $\gamma_k$ is assumed to be zero. Further, a propagation path whose received power is equal to or less than a predetermined threshold value may be determined to be absent. When the received power is equal to or less than the predetermined threshold value, the measurement results $d_{k,i}$ and $u_{k,i}$ of the k-th calibration antenna and the i-th distributed antenna DAi being associated are both zero.

The correction coefficient $\gamma_k$ depends on a frequency and varies by each subcarrier. The correction coefficient $\gamma_k$ may be obtained by taking an average for all subcarriers or each fixed number of subcarriers. Further, when an amplitude gain is small, an amplitude component of the correction coefficient $\gamma_k$ may be ignored, and only a phase component of the correction coefficient $\gamma_k$ may be used.

A calibration coefficient $c_i$ that calibrates the transmission gain $e_{i,t}$ and the reception gain $e_{i,r}$ of the distributed antenna DA in the transmission portion of the D-MIMO apparatus 11 is as in an equation (11).

$$c_i = \frac{\sum_{k=1}^{N_m} h_{u,k,i} \cdot h_{d,k,i}^* \cdot \gamma_k^{-1}}{\sum_{k=1}^{N} |h_{d,k,i}|^2} \tag{11}$$

$$= \frac{\varepsilon_{k0,t}}{\varepsilon_{k0,r}} \frac{\sum_{k=1}^{N_m} |\varepsilon_{k,r}|^2 |h_{k,r}|^2 e_{i,r} e_{i,t}^{-1}}{\sum_{k=1}^{N} |\varepsilon_{k,r}|^2 |h_{k,r}|^2} \tag{12}$$

Note that the number of times of calibration measurements performed by changing the calibration antenna is assumed to be $N_m$. In a case of the first example embodiment, $N_m = 4$. The number of the distributed antennas DA is assumed to be N. When the correction coefficient is $\gamma_k = 0$, it is assumed that $(\gamma_k)^{-1} = 0$. The equation (11) can be expanded as in an equation (12). According to the equation (12), the calibration coefficient $c_i$ is an average of $(e_{i,r}/e_{i,t})$ by assigning a weight of $(|\varepsilon_{k,r}|^2 |h_{k,r}|^2)$. Further, $(|\varepsilon_{k,r}|^2 |h_{k,r}|^2)$ is proportional to received power of a calibration signal.

When a calibration signal is actually measured, received power is greatly changed by an arrangement of the distributed antennas DA and the like. Normally, an influence of noise is reduced with greater received power, and an accurate calibration signal can be acquired. Thus, by taking an average by assigning a weight of $(|\varepsilon_{k,r}|^2 |h_{k,r}|^2)$, an influence of a measurement having a high degree of accuracy is increased and an influence of a measurement having a low degree of accuracy is reduced, and thus the calibration coefficient $c_i$ being accurate as a whole can be acquired.

When the calibration coefficient $c_i$ is actually applied to the D-MIMO apparatus 11, the calibration coefficient $c_i$ is normalized according to a dynamic range of the D-MIMO apparatus 11. Further, $(\varepsilon_{k0,t}/\varepsilon_{k0,r})$ in the equation (12) is a ratio of transmission/reception gains of a reference calibration antenna of the correction coefficient $\gamma_k$. Since this is fixed in all of the distributed antennas DA, accuracy of a DL signal is not affected. Thus, $(\varepsilon_{k0,t}/\varepsilon_{k0,r})$ is omitted in response to the normalization, and the equation (12) can be approximately represented as in an equation (13).

$$c_i = e_{i,r} e_{i,t}^{-1} \tag{13}$$

Thus, by using a ratio of the transmission/reception gains of the distributed antenna DA, calibration of the transmission portion of the D-MIMO apparatus 11 is performed.

The calibration coefficient $c_i$ is obtained for each subcarrier $s_i$ being used in calibration. The calibration coefficient $c_i$ of a subcarrier not being used in calibration such as a subcarrier being used in calibration of the other distributed antenna DA is obtained by interpolation and extrapolation from the calibration coefficient of the subcarrier $s_i$. Further, the calibration coefficient may be obtained by taking an average in a certain subcarrier range. In this way, calibration can be performed also in consideration of a frequency characteristic of an error between the distributed antennas DA.

In the first example embodiment, a calibration signal is disposed in all subcarriers, but calibration can also be performed by using only some of subcarriers. A subcarrier in which a calibration signal is not disposed is calibrated by interpolation and extrapolation from a calibration result of a neighboring subcarrier. Thus, calibration can be performed by using a subcarrier and a timing of a reference signal and the like even during operation.

Effect

An effect of the first example embodiment will be described. Herein, an effect of a normal operation state (see FIG. 3) of communicating with two UEs by using spatial multiplexing will be described. In the following description, the number of the UEs is assumed to be M=2. The number of the UEs is generally equal to or less than the number of the antennas of the D-MIMO apparatus 11, and, when the number of the distributed antennas DA is N, M may take any integer from 1 to N.

A UL signal being transmitted from each of the UEs and received (measured) by the distributed antenna DA is assumed to be U. The UL signal U is a matrix with N rows and 1 column (hereinafter described as N×1) and can be represented as in an equation (14).

$$U = E_r H Y \qquad (14)$$

H is a channel coefficient of a transmission path and is represented by a matrix of N×M, and Y is a UL signal being transmitted from the UE and is represented by M×1. $E_r$ represents a reception gain of the distributed antenna DA, is represented by using $e_{i,r}$, and is a diagonal matrix of N×N.

$$E_r = \begin{bmatrix} e_{1,r} & \cdots & 0 \\ \vdots & \ddots & \vdots \\ 0 & \cdots & e_{N,r} \end{bmatrix} \qquad (15)$$

The channel coefficient $H_u$ obtained by channel estimation from the received UL signal U is in an equation (16).

$$H_u = E_r H \qquad (16)$$

It can be seen that the reception gain $E_r$ is included in the channel coefficient $H_u$.

The precoding weight coefficient W is obtained by using a zero-forcing (ZF) algorithm being one of spatial multiplexing techniques as in an equation (17).

$$W^T = H_u^+ = (E_r H)^+ \qquad (17)$$

A superscript T of the precoding weight coefficient W indicates a transposed matrix, and a superscript + indicates a pseudo-inverse matrix. There are a plurality of spatial multiplexing techniques such as an MMSE algorithm in addition to the ZF algorithm, but an effect of calibration can be acquired similarly to the ZF algorithm.

A DL signal acquired by multiplying the precoding weight coefficient W and the calibration coefficient $c_i$ indicated in the equation (11) is transmitted from each of the distributed antennas DA. Then, the DL signal D received by each of the UEs is represented as follows.

$$D = H^T \cdot E_t C W X \qquad (18)$$

X is a matrix of M×1 and is an original signal to be transmitted to each of the UEs. In the first example embodiment, a signal is transmitted by one layer per one UE. C is a diagonal matrix of N×N as indicated in an equation (19) including the calibration coefficient $c_i$ obtained by the technique in the first example embodiment.

$$C = \begin{bmatrix} c_1 & \cdots & 0 \\ \vdots & \ddots & \vdots \\ 0 & \cdots & c_N \end{bmatrix} \qquad (19)$$

$E_t$ represents a transmission gain of the distributed antenna DA and is a diagonal matrix of N×N as in an equation (20).

$$E_t = \begin{bmatrix} e_{1,t} & \cdots & 0 \\ \vdots & \ddots & \vdots \\ 0 & \cdots & e_{N,t} \end{bmatrix} \qquad (20)$$

The calibration coefficient matrix C is represented as in an equation (21) by using the equation (13) to an equation (15) and the equation (20).

$$C = E_t^{-1} E_r \qquad (21)$$

An equation (22) and an equation (23) are acquired by substituting the equation (17) and the equation (21) for an equation (18).

$$D = H^T \cdot E_t E_t^{-1} E_r \{(E_r H)^+\}^T X \qquad (22)$$
$$= X \qquad (23)$$

In this way, by using the calibration coefficient C obtained in the first example embodiment, a transmission gain and a reception gain of the D-MIMO apparatus 11 can be corrected, and an accurate DL signal can be transmitted.

Note that the example of applying the first example embodiment to the D-MIMO apparatus is described, which is not limited thereto. The first example embodiment can also be applied to a C-MIMO apparatus. The C-MIMO apparatus is a MIMO apparatus in which a plurality of antennas are installed in one housing. When the first example embodiment is applied to the C-MIMO apparatus, one of the plurality of antennas installed in one housing is operated as a calibration antenna, and calibration is performed similarly to the D-MIMO apparatus. An antenna other than the calibration antenna and the calibration antenna in the C-MIMO apparatus transmit and receive a calibration DL signal and a calibration UL signal by a leakage of a radio wave. In this way, a calibration feedback circuit and the like do not need to be installed.

Second Example Embodiment

Figure 12:
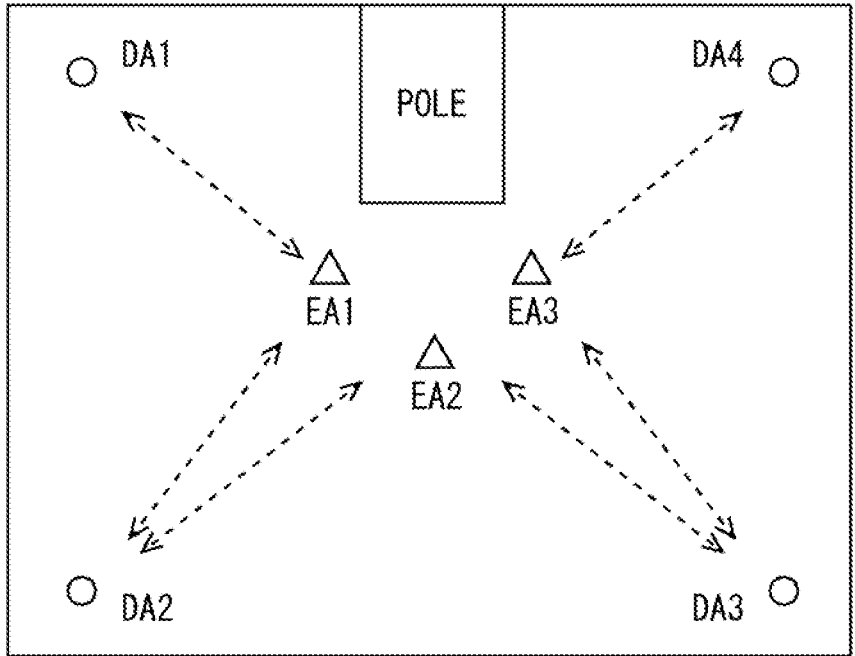
FIG. 12 is a schematic diagram illustrating installation of a distributed antenna and an external antenna according to a second example embodiment.

FIG. 12 is a schematic diagram illustrating installation of a distributed antenna and an external antenna according to a second example embodiment.

In the first example embodiment, calibration is performed by using the antenna included in the D-MIMO apparatus or the C-MIMO apparatus. On the other hand, in the second example embodiment, a calibration external antenna is used. In this example, description is given on an assumption that the number of the external antennas is three. An antenna other than one antenna among the plurality of antennas is an antenna constituting a MIMO. Further, the one antenna among the plurality of antennas is an external antenna that is not an antenna constituting the MIMO.

As illustrated in FIG. 12, external antennas EA are installed in a room. Depending on an installation place of distributed antennas DA, it may be difficult to communicate with all of the distributed antennas DA only with one external antenna (for example, an external antenna EA1). Thus, a calibration measurement is performed by using the plurality of external antennas EA. Alternatively, a calibration measurement is performed with all of the distributed antennas DA by moving one external antenna. Measurements for a plurality of times with the plurality of external antennas EA and by a position movement can be handled similarly to measurements when the number k of the calibration antenna in the first example embodiment is changed.

In the second example embodiment, the example of using a calibration method using the external antenna EA in the D-MIMO apparatus is described, which is not limited thereto. The calibration method according to the second example embodiment can also be applied to a C-MIMO apparatus.

Third Example Embodiment

Figure 13:
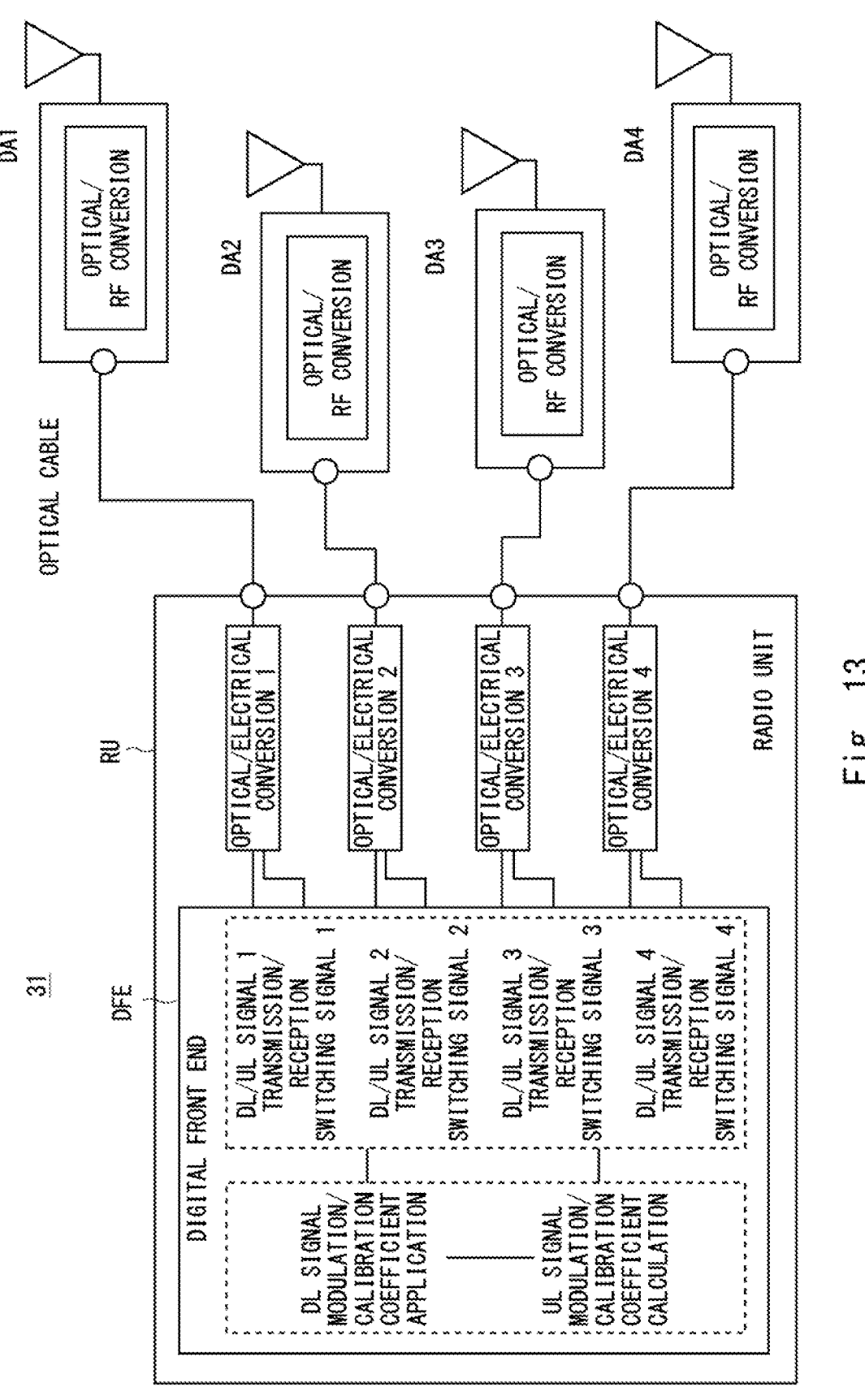
FIG. 13 is a block diagram illustrating a configuration of a D-MIMO apparatus according to a third example embodiment.

FIG. 13 is a block diagram illustrating a configuration of a D-MIMO apparatus according to a third example embodiment.

A D-MIMO apparatus 11 according to the third example embodiment is different from the D-MIMO apparatus 31 according to the first example embodiment in a point that a radio unit RU and a distributed antenna unit DU are connected by an optical cable.

As illustrated in FIG. 13, a DL signal generated by a digital front end DFE of the radio unit RU is converted into an optical signal together with a transmission/reception switching signal, and is transmitted to the distributed antenna unit DA through the optical cable. The optical signal transmitted to the distributed antenna unit DA is converted into an electric signal, is then converted into an RF signal, and is transmitted from an antenna. Inverse processing to the DL signal is performed on a UL signal.

It is assumed that reference clocks being a reference of the radio unit RU and each of the distributed antenna units DA are synchronized. However, even when the reference clocks are synchronized, transmission/reception characteristics of the distributed antenna units DA each vary due to variations in analog circuit characteristics such as skew of the reference clocks and a phase of a local oscillator. According to the third example embodiment, a difference between the transmission/reception characteristics of the distributed antenna units DA can be calibrated by a method similar to that in the first example embodiment.

Although the present disclosure has been described above as a configuration of hardware in the example embodiments described above, the present disclosure is not limited to the example embodiments. The present disclosure can also achieve processing of each component by causing a central processing unit (CPU) to execute a computer program.

In the example embodiments described above, the program may be stored by using various types of non-transitory computer readable mediums, and may be supplied to a computer. The non-transitory computer readable medium includes various types of tangible storage mediums. Examples of the non-transitory computer readable medium include a magnetic recording medium (specifically, a flexible disk, a magnetic tape, and a hard disk drive), a magneto-optical recording medium (specifically, a magneto-optical disk), a CD-read only memory (CD-ROM), a CD-R, a CD-R/W, and a semiconductor memory (specifically, a mask ROM, a programmable ROM (PROM), an erasable PROM (EPROM), a flash ROM, and a random access memory (RAM)). Further, the program may be supplied to the computer by various types of transitory computer readable mediums. Examples of the transitory computer readable medium include an electrical signal, an optical signal, and an electromagnetic wave. The transitory computer readable medium may supply the program to the computer via a wired communication path such as an electric wire and an optical fiber or a wireless communication path.

Furthermore, the operations are illustrated in a specific order, but it should not be understood that the illustrated operations are required to be performed in the specific order or a continuous order or all of the illustrated operations are required to be performed. In a specific situation, multitasking and parallel processing may be advantageous. Similarly, the details of some of the specific example embodiments are included in the discussion described above, but the details do not limit the range of the present disclosure and should be interpreted as description of characteristics being unique to the specific example embodiments. The specific characteristics described in the context of different example embodiments may be implemented by combining into a single example embodiment. Conversely, various characteristics described in the context of a single example embodiment may be implemented separately in the plurality of example embodiments or by any appropriate combination.

Although the disclosure of the present application has been described with reference to the example embodiments, the disclosure of the present application is not limited to the above-described example embodiments. Various modifications that can be understood by those skilled in the art can be made to the configuration and the details of the disclosure of the present application within the scope of the disclosure.

Note that the present disclosure is not limited to the embodiments described above, and may be appropriately modified without departing from the scope of the present disclosure.

This application is based upon and claims the benefit of priority from Japanese patent application No. 2020-209739, filed on Dec. 17, 2020, the disclosure of which is incorporated herein in its entirety by reference.

REFERENCE SIGNS LIST

11: RADIO COMMUNICATION APPARATUS, D-MIMO APPARATUS
111: CALIBRATION CONTROL UNIT
112: CALIBRATION COEFFICIENT CALCULATION UNIT
113: CALIBRATION APPLICATION UNIT
1141, 1142, 1143, 1144: TRANSMITTER-RECEIVER

US 12,621,026 B2

21

1141*t*, 1142*t*, 1143*t*, 1144*t*: TRANSMITTER
1141*r*, 1142*r*, 1143*r*, 1144*r*: RECEIVER
1151: LAYER MAPPER UNIT
1152: PRECODING UNIT
1153: OFDM SIGNAL GENERATION UNIT
1154: OFDM SIGNAL DEMODULATION UNIT
1155: CHANNEL ESTIMATION UNIT
1156: PRECODING WEIGHT CALCULATION UNIT
DA, DA1, DA2, D3, DA4: DISTRIBUTED ANTENNA, DISTRIBUTED ANTENNA UNIT
EA, EA1, EA2, EA3: EXTERNAL ANTENNA
RU: RADIO UNIT
DFE: DIGITAL FRONT END
MODEM: MODULATOR-DEMODULATOR

What is claimed is:

1. A radio communication apparatus comprising:
at least one memory storing instructions, and
at least one processor configured to execute the instructions to:
perform, for each of a plurality of antennas, down link (DL) control for transmitting a calibration DL signal from an antenna other than one antenna among a plurality of the antennas and receiving the calibration DL signal by the one antenna, and up link (UL) control for transmitting a calibration UL signal from the one antenna and receiving the calibration UL signal by the antenna other than the one antenna;
calculate a DL channel coefficient of a transmitter and a UL channel coefficient of a receiver that are connected to the antenna for each of a plurality of the antennas, based on the calibration DL signal being transmitted from a plurality of the antennas and the calibration DL signal being received by a plurality of the antennas in the DL control, and the calibration UL signal being transmitted from a plurality of the antennas and the calibration UL signal being received by a plurality of the antennas in the UL control;
calculate a calibration coefficient for calibrating a radio DL signal, based on the DL channel coefficient and the UL channel coefficient;
adjust a phase and an amplitude of the radio DL signal being transmitted from each of a plurality of the antennas, based on the calibration coefficient;
calculate, for each of a plurality of the antennas, a plurality of the DL channel coefficients being associated with the antenna other than the one antenna, based on the calibration DL signal during transmission being transmitted from the antenna other than the one antenna and the calibration DL signal during reception being received by the one antenna;
calculate, for each of a plurality of the antennas, a plurality of the UL channel coefficients being associated with the antenna other than the one antenna, based on the calibration UL signal during transmission being transmitted from the one antenna and the calibration UL signal during reception being received by the antenna other than the one antenna;
calculate the calibration coefficient for calibrating the radio DL signal, based on the DL channel coefficient and the UL channel coefficient that are calculated from a plurality of calibration measurements acquired by the DL control and the UL control;
calculate, as a channel coefficient ratio, a proportion of the DL channel coefficient to the UL channel coefficient being calculated from a plurality of the calibration measurements;

select, as a reference channel coefficient ratio, one of the channel coefficient ratios of a plurality of the calibration measurements;
calculate, as a correction coefficient between a plurality of calibration measurements, a proportion of the reference channel coefficient ratio to the channel coefficient ratio of a plurality of the calibration measurements; and
correct a proportion of the DL channel coefficient to the UL channel coefficient with respect to a plurality of the calibration measurements by using the correction coefficient between a plurality of the calibration measurements.

2. The radio communication apparatus according to claim 1, wherein the at least one processor is further configured to:
calculate an average correction coefficient by taking an average of the correction coefficient between a plurality of the calibration measurements being calculated in a plurality of the calibration measurements; and
newly set the average correction coefficient as the correction coefficient.

3. The radio communication apparatus according to claim 1, wherein the at least one processor is further configured to:
perform the calibration measurement for a plurality of times, and acquire a weighted coefficient, based on received power of the calibration DL signal or the calibration UL signal, when a plurality of the DL channel coefficients and the UL channel coefficients are acquired for the one antenna;
calculate, as a UL/DL channel coefficient ratio, a ratio of the DL channel coefficient to the UL channel coefficient for each of the calibration measurements from the DL channel coefficient and the UL channel coefficient;
perform, by using the correction coefficient, correction between the calibration measurements on the UL/DL channel coefficient ratio for each of the calibration measurements;
calculate, for each of a plurality of the antennas, a weighted average UL/DL channel coefficient ratio acquired by performing weighted averaging between a plurality of the calibration measurements, based on the weighted coefficient, on the UL/DL channel coefficient ratio for each of the corrected calibration measurements; and
newly set the weighted average UL/DL channel coefficient ratio as the calibration coefficient.

4. The radio communication apparatus according to claim 1, wherein the at least one processor is configured to perform control in such a way that the calibration DL signal having a different frequency is transmitted from each of a plurality of the antennas.

5. The radio communication apparatus according to claim 1, wherein, when a difference between a temperature of any of a plurality of the antennas and a temperature during previous calibration is equal to or more than a predetermined temperature, or when a difference between an average temperature of all of the antennas and a temperature during previous calibration is equal to or more than the predetermined temperature, the at least one processor is configured to adjust a phase and an amplitude of the radio DL signal again.

6. The radio communication apparatus according to claim 1, wherein:
the antenna other than the one antenna is an antenna constituting a multiple input multiple output (MIMO), and the one antenna is an external antenna that is not an
antenna constituting the MIMO.

7. A method for a radio communication apparatus, comprising:

performing, for each of a plurality of antennas, down link
(DL) control for transmitting a calibration DL signal
from an antenna other than one antenna among a
plurality of the antennas and receiving the calibration
DL signal by the one antenna, and up link (UL) control
for transmitting a calibration UL signal from the one
antenna and receiving the calibration UL signal by the
antenna other than the one antenna;

calculating a DL channel coefficient of a transmitter and
a UL channel coefficient of a receiver that are connected to the antenna for each of a plurality of the
antennas, based on the calibration DL signal being
transmitted from a plurality of the antennas and the
calibration DL signal being received by a plurality of
the antennas in the DL control, and the calibration UL
signal being transmitted from a plurality of the antennas and the calibration UL signal being received by a
plurality of the antennas in the UL control;

calculating a calibration coefficient for calibrating a radio
DL signal, based on the DL channel coefficient and the
UL channel coefficient;

adjusting a phase and an amplitude of the radio DL signal
being transmitted from each of a plurality of the
antennas, based on the calibration coefficient;

calculating, for each of a plurality of the antennas, a
plurality of the DL channel coefficients being associated with the antenna other than the one antenna, based
on the calibration DL signal during transmission being
transmitted from the antenna other than the one antenna
and the calibration DL signal during reception being
received by the one antenna;

calculating, for each of a plurality of the antennas, a
plurality of the UL channel coefficients being associated with the antenna other than the one antenna, based
on the calibration UL signal during transmission being
transmitted from the one antenna and the calibration
UL signal during reception being received by the
antenna other than the one antenna;

calculating the calibration coefficient for calibrating the
radio DL signal, based on the DL channel coefficient
and the UL channel coefficient that are calculated from
a plurality of calibration measurements acquired by the
DL control and the UL control;

calculating, as a channel coefficient ratio, a proportion of
the DL channel coefficient to the UL channel coefficient
being calculated from a plurality of the calibration
measurements;

selecting, as a reference channel coefficient ratio, one of
the channel coefficient ratios of a plurality of the
calibration measurements;

calculating, as a correction coefficient between a plurality
of calibration measurements, a proportion of the reference channel coefficient ratio to the channel coefficient
ratio of a plurality of the calibration measurements; and correcting a proportion of the DL channel coefficient to
the UL channel coefficient with respect to a plurality of
the calibration measurements by using the correction
coefficient between a plurality of the calibration measurements.

8. A non-transitory computer readable medium storing a
program configured to cause a computer to execute:

performing, for each of a plurality of antennas, down link
(DL) control for transmitting a calibration DL signal
from an antenna other than one antenna among a
plurality of the antennas and receiving the calibration
DL signal by the one antenna, and up link (UL) control
for transmitting a calibration UL signal from the one
antenna and receiving the calibration UL signal by the
antenna other than the one antenna;

calculating a DL channel coefficient of a transmitter and
a UL channel coefficient of a receiver that are connected to the antenna for each of a plurality of the
antennas, based on the calibration DL signal being
transmitted from a plurality of the antennas and the
calibration DL signal being received by a plurality of
the antennas in the DL control, and the calibration UL
signal being transmitted from a plurality of the antennas and the calibration UL signal being received by a
plurality of the antennas in the UL control;

calculating a calibration coefficient for calibrating a radio
DL signal, based on the DL channel coefficient and the
UL channel coefficient;

adjusting a phase and an amplitude of the radio DL signal
being transmitted from each of a plurality of the
antennas, based on the calibration coefficient;

calculating, for each of a plurality of the antennas, a
plurality of the DL channel coefficients being associated with the antenna other than the one antenna, based
on the calibration DL signal during transmission being
transmitted from the antenna other than the one antenna
and the calibration DL signal during reception being
received by the one antenna;

calculating, for each of a plurality of the antennas, a
plurality of the UL channel coefficients being associated with the antenna other than the one antenna, based
on the calibration UL signal during transmission being
transmitted from the one antenna and the calibration
UL signal during reception being received by the
antenna other than the one antenna;

calculating the calibration coefficient for calibrating the
radio DL signal, based on the DL channel coefficient
and the UL channel coefficient that are calculated from
a plurality of calibration measurements acquired by the
DL control and the UL control;

calculating, as a channel coefficient ratio, a proportion of
the DL channel coefficient to the UL channel coefficient
being calculated from a plurality of the calibration
measurements;

selecting, as a reference channel coefficient ratio, one of
the channel coefficient ratios of a plurality of the
calibration measurements;

calculating, as a correction coefficient between a plurality
of calibration measurements, a proportion of the reference channel coefficient ratio to the channel coefficient
ratio of a plurality of the calibration measurements; and correcting a proportion of the DL channel coefficient to
the UL channel coefficient with respect to a plurality of
the calibration measurements by using the correction
coefficient between a plurality of the calibration measurements.

* * * * *